(12) United States Patent
Schreiber et al.

(10) Patent No.: US 6,603,090 B1
(45) Date of Patent: Aug. 5, 2003

(54) PULVERULENT FILLER AND METHOD FOR APPLYING A WEAR-RESISTANT LAYER

(75) Inventors: Frank Schreiber, Krefeld (DE); Peter Knauf, Düsseldorf (DE)

(73) Assignee: Durum Verschleissschutz GmbH, Krefeld (DE)

( * ) Notice: Subject to any disclaimer, the term of this patent is extended or adjusted under 35 U.S.C. 154(b) by 0 days.

(21) Appl. No.: 09/356,140

(22) Filed: Jul. 19, 1999

(51) Int. Cl.[7] ................................................. B23K 9/04
(52) U.S. Cl. ................... 219/76.14; 219/76.1; 219/119; 219/146.23
(58) Field of Search ............................ 219/76.14, 76.1, 219/76.16, 119, 146.1, 146.23, 146.3, 146.51; 428/656

(56) References Cited

U.S. PATENT DOCUMENTS

| | | | |
|---|---|---|---|
| 2,137,471 A | 11/1938 | Zublin | 219/3 |
| 4,224,382 A | 9/1980 | Brown et al. | 428/656 |
| 4,515,869 A * | 5/1985 | Bose et al. | 428/656 |
| 4,800,131 A * | 1/1989 | Marshall et al. | 428/558 |
| 5,250,355 A * | 10/1993 | Newman et al. | 428/367 |
| 6,124,564 A * | 9/2000 | Sue et al. | 219/121.47 |

FOREIGN PATENT DOCUMENTS

| | | |
|---|---|---|
| DE | 1558873 | 7/1967 |
| DE | 87 16 743.3 | 12/1987 |
| DE | 40 08 091 C2 | 3/1990 |
| EP | 0 446 978 A1 | 3/1990 |

* cited by examiner

Primary Examiner—M. Alexandra Elve
(74) Attorney, Agent, or Firm—Collard & Roe, P.C.

(57) ABSTRACT

Method for applying a wear-resistant layer comprising a nickel alloy matrix and intercalated tungsten carbides and/or vanadium carbides to a surface which is to be protected using arc welding or plasma welding.

10 Claims, 4 Drawing Sheets

PULVERULENT FILLER AND METHOD FOR APPLYING A WEAR-RESISTANT LAYER

FIELD OF THE INVENTION

The invention related to a pulverulent filler for applying a wear-resistant layer comprising a nickel alloy matrix and intercalated (tungsten carbides and) vanadium carbides to a surface which is to be protected, using the metal spraying route, in particular arc welding or plasma welding.

BACKGROUND OF THE INVENTION

Wear-resistant layers of this nature are usually applied to the surface of tools, such as implements used in mining, in deep drilling, in the ceramics industry and the like. Wear-resistant layers are generally used to counteract the progressive loss of material on the surface of a solid body. Such loss of material, also known as wear, generally results from mechanical causes, i.e. generally from contact with and movements relative to another body. Consequently, tribological investigations have made it possible to develop various processes for applying metal coatings, including metal spray coatings. These coatings are regularly applied to particularly large workpieces or workpieces which are only to be treated in certain areas. In this case, the metal, which is in wire or powder form, is melted by a fuel gas mixture or by an arc and is thrown onto the workpiece which is to be treated in the form of fine droplets, by means of compressed air. The adhesion to the surface is purely mechanical, for which reason the latter is generally roughened to an average roughness by sand-blasting.

In practice, processes for applying wear-resistant layers of the basic structure described above which are based on oxyacetylene welding processes or electric arc welding processes are known. When using electric arc welding to apply wear-resistant layers, consumable stick electrodes or flux-cored electrodes which comprise small alloy tubes with a finely particulate filling are customarily used. A distinction is generally drawn between stick electrodes or flux-cored electrodes on the basis of DIN 8571, and in the context of the invention such electrodes are distinguished by a nickel casing and a powder filling on the inside.

In addition to the abovementioned deposition welding processes, it is generally known to apply pulverulent fillers directly onto a substrate in the course of plasma-arc powder surfacing. In this case, work is always carried out in such a way that the pulverulent filler can be fed from a storage container to the associated plasma torch via a metering device, with the aid of a carrier gas. Consequently, it is possible to do without a welding electrode.

The nickel alloy matrix essentially serves to accommodate and support intercalated (tungsten) carbide grains. These carbide grains form the actual hard-facing, which is mainly responsible for the antiwear and friction properties of the wear-resistant layer applied. According to the prior art, small nickel tubes containing an accurately specified mixture of tungsten carbides and a suitable amount of alloying elements are used as the welding electrodes.

This results, for the wear-resistant layer, in, for example, a nickel-(chromium)-boron-silicon matrix, in the form of a corresponding alloy (cf. DE 40 08 091 C2).

Moreover, in the context of arc welding for applying wear-resistant layers, it is generally known to use small tubes made from a nickel base alloy or from a cobalt base alloy (cf., for example, DE 87 16 743 U1). The wear-resistant layers with a nickel alloy matrix which are applied during electric arc welding cannot always be produced with satisfactory results. Moreover, the welding work using an electric arc produces further drawbacks which are attributable to the high thermal load imposed on the tungsten carbides, since the tungsten carbides may decompose, specifically, in the most part, into the two hard phases tungsten monocarbide WC and ditungsten carbide $W_2C$. Particularly the latter, ditungsten carbide, is more brittle, owing to its lower modulus of elasticity (compared to WC) and is therefore less suitable for incorporation in a wear-resistant layer (cf. U.S. Pat. No. 2,137,471).

Also, the temperatures which prevail in the arc may lead to a high level of carburization, i.e., as it were, at the extremely high temperatures in the plasma discharge space, graphite is deposited in the alloy matrix. This is to be avoided at all costs, since the matrix alloys are to have as low a carbon content as possible, in order to counteract embrittlement.

At any rate, the prior art may lead to flaking of the hard-facing, particularly under impact loads or dynamic loads. In addition, the matrix basic structure (which is soft by comparison with the hard phases) may wear prematurely, particularly under high abrasive loads with mineral particles of <20 Tm, so that the tungsten carbide hard materials or tungsten carbide grains which are actually to be protected or supported are washed out. Consequently, damage to the wear-resistant layer results not only from the fact that the (di)tungsten carbide hard-facing which is formed is unable (no longer able) to withstand high loads, but also from the fact that the alloy matrix (which in itself is protective) is additionally abraded.

In addition, in the event of abrasive-adhesive loads, such as for example those which are found in the case of pressure worms used in the ceramics industry, the use of tungsten-carbide-reinforced protective layers is restricted, in view of the fact that in this application the hard tungsten carbide materials or grains which are found in the hard-facing lead to adhesion of the ceramic material. Consequently, enormous drive powers are required in order to ensure continuous production operation with a sufficient throughput. At any rate, the fillers, welding electrodes and production processes for wear-resistant layers based on tungsten carbides as described above are entirely unable to satisfy requirements. The invention wishes to provide a remedy to these problems

SUMMARY OF THE INVENTION

The invention is based on the technical problem of providing a pulverulent filler for applying a wear-resistant layer comprising a nickel alloy matrix and intercalated carbides to a surface which is to be protected, using the metal spraying route, which filler produces an improved microstructure morphology of the nickel alloy matrix and optimized sliding properties for the wear-resistant layer. Moreover, it is intended to provide a suitable method for applying such wear-resistant layers.

To solve this object, the subject matter of the invention comprises pulverulent fillers. The invention furthermore relates to a method for applying a wear-resistant layer comprising a nickel alloy matrix with intercalated tungsten carbides and/or vanadium carbides to a surface which is to be protected, via the metal spraying route, in particular arc welding or plasma welding, on the basis of the pulverulent fillers according to the invention.

In the course of the invention, a controlled improvement in the microstructure morphology of the nickel alloy matrix and an optimization of the wear resistance have been achieved by the controlled use of vanadium or vanadium carbide. Specifically, the heat-related tungsten carbide decomposition described above is compensated for, because the vanadium br vanadium carbide which has dissolved in the molten pool lads to primary carbide precipitations out of the molten pool. These primary carbide precipitations mainly involve vanadium carbide VC, i.e. in particular vanadium nitride VN, for example, is not formed. The production of ditungsten carbide is also suppressed. The same applies to vanadium pentoxide $V_2O_5$.

At any rate, the high carburization of the nickel alloy matrix outlined above is successfully counteracted, by the very addition of vanadium which, in dissolved form, is converted into vanadium carbide with any carbon which is formed. These primary carbides or vanadium carbide nuclei result in a fine-grained (and desired) solidification of the remaining molten pool or of the nickel alloy matrix. The fact that carburization is, as it were, automatically avoided makes it possible to successfully prevent embrittlement of the nickel alloy matrix.

Furthermore, the primary formation of vanadium carbide VC avoids the possible formation of other vanadium-rich mixed carbides with different properties, in particular brittle phases. Also, it is not necessary to use carbides which have a lower carbon content than the stoichiometric composition, as is provided for by DE-B 1,558,873, in order to be able to counteract carbide decomposition, with the deposition of graphite, at the extremely high temperature in the plasma discharge space. Consequently, the production of the fused composite layer or nickel alloy matrix is not prevented, in that the so-called "self-flowing effect" of the alloy is not suppressed, i.e. an unaltered homogeneous distribution of the alloying constituents over the surface is achieved (cf. DE 87 16 743 U1).

Furthermore, the addition of vanadium carbide grains significantly increases the wear resistance and improves the sliding properties. This can be attributed essentially to the fact that vanadium carbide has an extremely high hardness of up to almost 3000 $H_v$ (Vickers hardness). Furthermore, the addition of vanadium or vanadium carbide grains allows the wear resistance of the nickel alloy matrix (with intercalated tungsten carbide grains) to be influenced within wide limits. In this connection, it is simply necessary for the vanadium carbide grains to be fixedly bonded into the nickel alloy matrix, which is achieved by fusing their surface. In the same way, the nickel alloy matrix must have a certain hardness, so that the desired supporting effect is achieved.

The stoichiometric composition of the pulverulent filler which is indicated according to the invention not only considerably increases the wear resistance of the wear-resistant layer, but also, at the same time, produces a homogeneous distribution of the carbides in the nickel alloy matrix. A precondition for this is that the indicated composition and the use of the grain sizes described be adhered to. In this case, for example, a grain size of from 0.01 mm to 0.3 mm is used for the tungsten carbide grains and a grain size of from 0.05 mm to 0.3 mm is used for the vanadium carbide grains. An alternative possibility is the combination of tungsten carbide grains with a grain size of from 0.3 mm to 2.0 mm with vanadium carbide grains with a grain size of from 0.05 mm to 0.3 mm.

Overall, it is possible, in the context of the invention, to observe and control interactions between the main alloying constituent, i.e. nickel, the tungsten or the tungsten carbide grains, and the vanadium or the vanadium carbide grains, which reduce wear. This also applies to the situation where the addition of tungsten or tungsten carbide grains is dispensed with altogether. As a result, in particular the addition of vanadium makes it possible to improve the microstructure morphology of the alloy matrix so as to achieve a higher strength, with the result that, in conjunction with intercalated vanadium carbide grains (and the tungsten carbide grains), the wear resistance is increased considerably and, at the same time, the roughness of the coating is reduced.

In the context of the teaching of the invention, the method is controlled in such a way that the vanadium carbide grains and/or the tungsten carbide grains practically do not dissolve at all during the welding operation or do dissolve during the welding operation and are precipitated in a homogeneous distribution during cooling. Whether or not the respective carbide grains dissolve in the nickel alloy matrix depends on complex thermodynamic laws. In particular, the above-described method is dependent on the grain size, the (welding) time and the (welding) temperature. Naturally, the grain size can also be used to adjust the surface of the tungsten/vanadium carbide grains. The above-mentioned parameters are specified in more detail, which, in particular by means of the (welding) voltage and (welding) current intensity parameters, specify the (welding) temperature when using of predetermined grain sizes of the vanadium and/or tungsten carbide grains.

At any rate, by analyzing the molten pool holding the vanadium carbide grains, it is possible to adjust the surface of these grains in such a way that the improvement in wear resistance which is desired according to the invention, as well as an optimization of the microstructure morphology of the alloy matrix, can be achieved in a reproducible manner. If the vanadium carbide grains dissolve in the nickel alloy matrix during the welding operation, they are precipitated in a homogeneous distribution during cooling, i.e. are distributed uniformly between the tungsten carbide grains, if such grains are present.

Even with a high tungsten content in the pulverulent mixture, in the context of the invention a nickel alloy matrix is still provided, since the metallic tungsten in the mixture leads to the tungsten carbide being precipitated in a homogeneous distribution in the form of fine crystals. This takes place in the matrix, which still remains a nickel alloy matrix. Naturally, in this case the tungsten carbide crystals produced in this way are not considered to belong to the nickel alloy matrix. If fused tungsten carbides (TFC) are used, this means a mixture of WC and $W_2C$ produced by fusion. A similar statement applies to fused vanadium carbides.

BRIEF DESCRIPTION OF THE DRAWINGS

The invention will be better understood by the DETAILED DESCRIPTION OF THE PREFERRED EMBODIMENT with reference to the drawings, in which.

DETAILED DESCRIPTION OF THE PREFERRED EMBODIMENT

Figure 1:
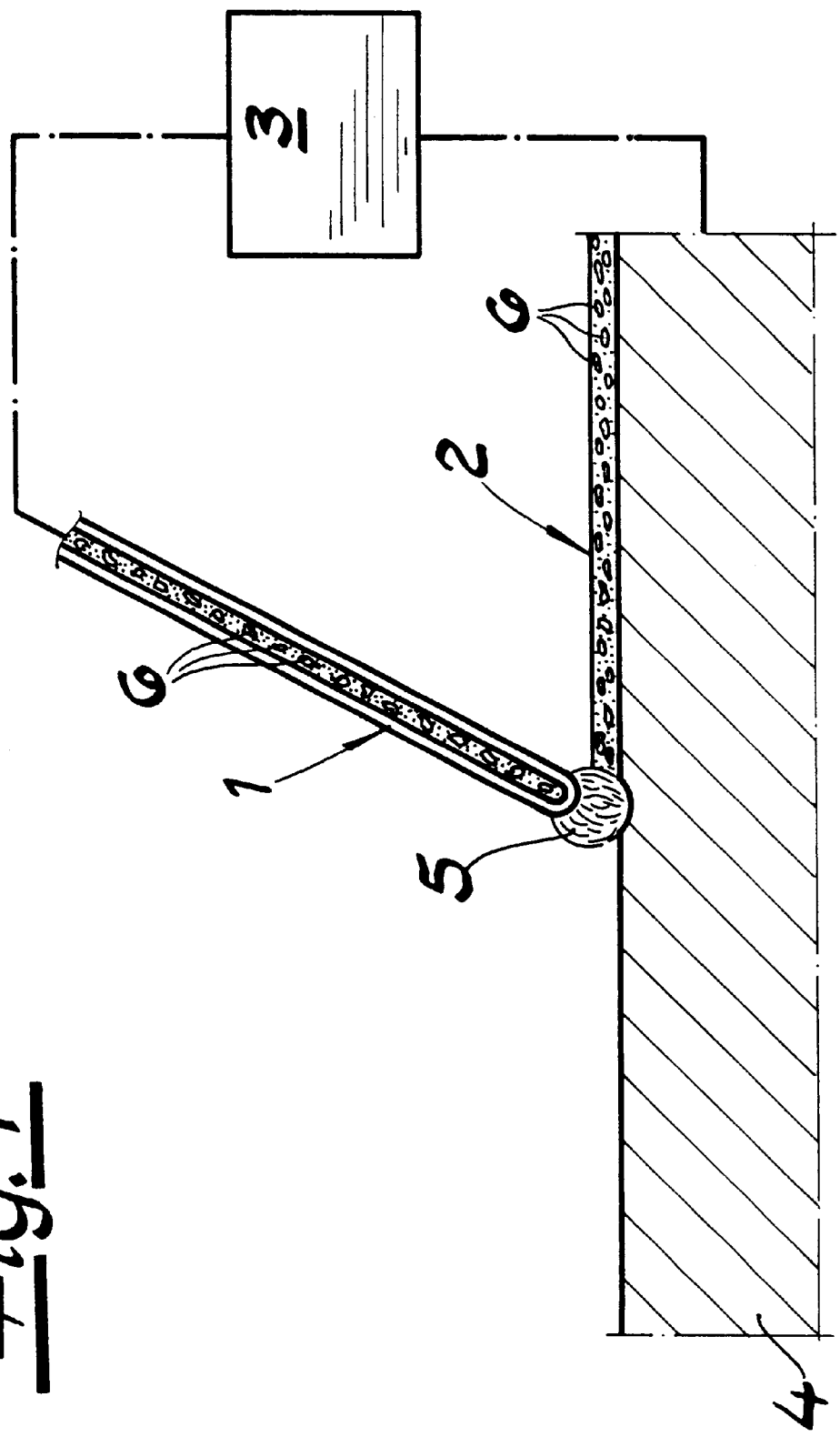
FIG. 1 is a side view of an arc welding deposition device.

In the case of the arc welding deposition device shown in FIG. 1, the procedure is as follows: an electrode 1 is used for the arc welding of a coating 2 and is acted on by means of a voltage device 3 which generates an electric voltage between electrode 1 and substrate 4. The coating 2 is applied to the substrate 4, in the present case a metal substrate 4. This may be a steel surface of a tool which is to be coated. The action of the voltage device 3 produces an arc 5 between (stick) electrode 1 and substrate 4. The arc 5 fuses the pulverulent constituents in the (stick) electrode 1, as well as their nickel casing, and these materials are applied to the substrate 4 as a coating 2. The pulverulent filling, which is of the composition described in patent claims 1 to 5, can be seen inside the (stick) electrode or the small nickel tube 1. In addition, tungsten carbide grains and/or vanadium carbide grains 6 are embedded in the abovementioned filling, which grains form the actual hard-facing in the coating 2. Fluxes are also mixed into the filling.

Figure 2:
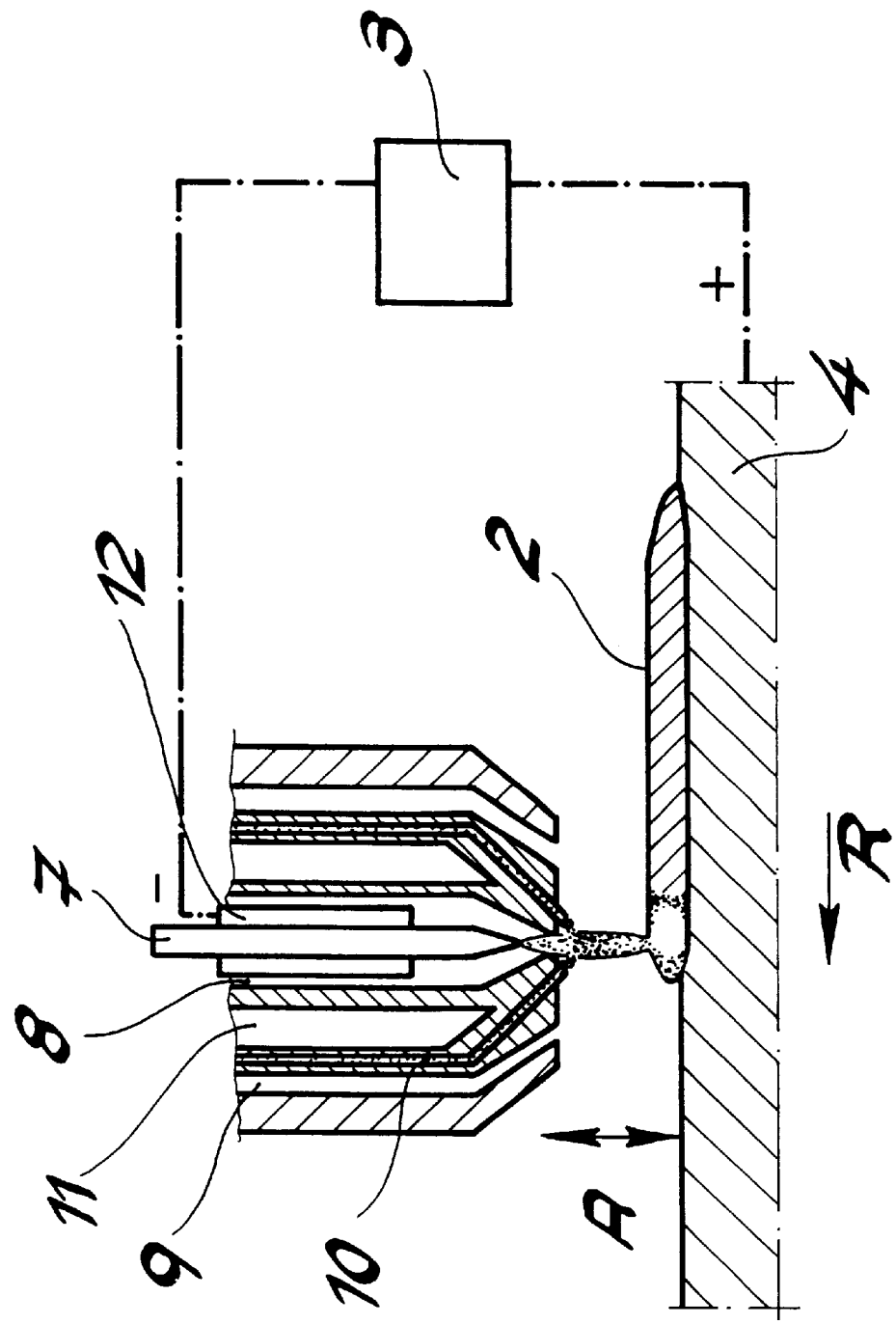
FIG. 2 is a view of a plasma-arc powder surfacing device.

FIG. 2 shows a plasma-arc powder surfacing device, which has a (tungsten) electrode 7 to which a (DC) voltage is applied with respect to the substrate 4 by means of the voltage device 3. The respective poles are indicated by a plus sign and a minus sign. The supply of a plasma gas 8 produces a plasma between the device shown and the substrate 4. In addition, a shielding gas 9 is supplied. The novel powder or pulverulent filler is fed toward the plasma by means of a carrier gas 10. Finally, the figure also shows a cooling system 11 and a current contact 12 for the (tungsten) electrode 7.

In the case of plasma-arc powder surfacing, a distinction is generally drawn between a so-called internal powder supply and the external powder supply illustrated here. In the case of internal powder supply, the powder in the stream of carrier gas 10 enters the plasma or the plasma column in the immediate vicinity of a plasma nozzle within the torch geometry. Since there is a considerable difference in speed between the thermally expanding plasma gas and the carrier gas 10, the powder, as a result of the injector effect, is, as it were, drawn into the plasma jet and accelerated toward substrate 4. The arc serves mainly for incipient melting or fusion of the powder and for incipient melting of the substrate 4.

In the case of the external powder supply shown here, the powder is only supplied to the plasma jet outside the torch geometry, with the result that it has a considerably shorter residence time in the plasma or in the arc. This leads to a considerably reduced uptake of heat by the filler, which is associated with a reduced thermal load but also entails the risk of fusion defects or of excessive substrate dilution. In the case of external supply, the powder utilization level is to a large extent dependent on the distance A between the torch and the substrate 4. It (the powder utilization level) is generally lower than for internal powder supply.

EXAMPLE

For deposition welding, a powder or a pulverulent filler is used, which contains tungsten carbide grains with a grain size of from 0.01 mm to 0.3 mm and vanadium carbide grains with a grain size of from 0.05 mm to 0.3 mm. The mixture composition of the powder is as follows:

| | | |
|---|---|---|
| W  | 45% by weight  | |
| V  | 15% by weight  | Σ 66% by weight |
| Cr | 6% by weight   | |
| B  | 1.2% by weight | |
| Si | 2.0% by weight | Σ 6% by weight |
| C  | 2.8% by weight | |
| | | 72% by weight | remainder (28% by weight) nickel. This is present either in powder form or is introduced into the coating by means of a small nickel tube, as consumable welding electrode. Naturally, a combination of the above mentioned measures is also conceivable.

Welding parameters: 24 V and 150 A.

Hardness which can be achieved: 570 to 650 HV of the nickel alloy matrix, and greater than 2000 $H_v$ for the intercalated WC particles.

Figure 3:
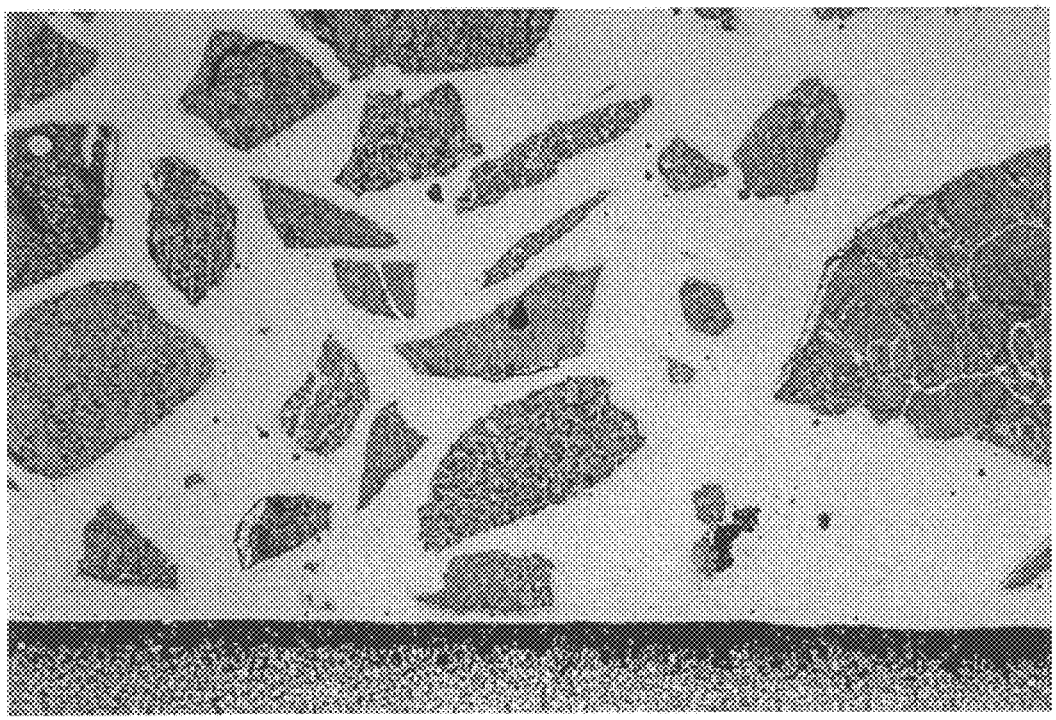
FIG. 3 shows microstructure of NiCrBSi alloy with intencalcated hard FCT materials (100:1) enlargement.
Figure 4:
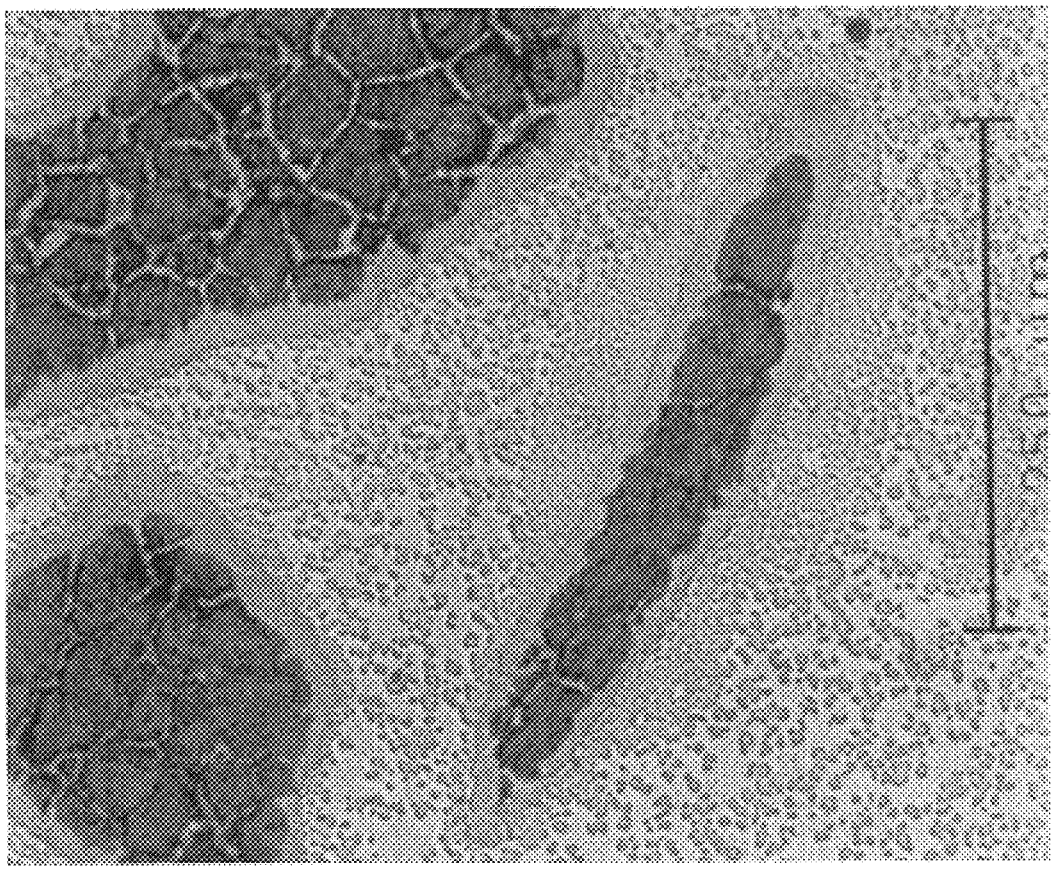
FIG. 4 shows microstructure of NiCrBSi alloy with intercalcated hard FTC and materials (100:1 enlargement).

FIGS. 3 and 4 represent particularly clearly the difference between a conventional alloy and the wear-resistant layer which can be achieved using the filler according to the invention. The typical microstructure of a conventional alloy is illustrated in FIG. 3 and has FTC particles intercalated in a nickel alloy matrix (light area). (FTC=fused tungsten carbide; dark islands). While the hardness of the matrix is approximately 450 $H_v$, the hardness of the intercalated FTC particles is more than 2000 $H_v$. Particularly in the case of small FTC particles, wear results in the matrix alloy being washed out and in the FTC particles then being broken off.

In the context of the invention, finely distributed VC particles are intercalated in the matrix microstructure, as indicated in FIG. 4 by the small, light gray dots. Consequently, the VC particles reinforce the matrix microstructure, so that the FTC particles are supported by the addition of VC.

While the preferred embodiment of the invention has been depicted in detail, modifications and adaptations may be made thereto without departing from the spirit and scope of the invention as delineated in the following claims:

What is claimed is:

1. A pulverulent filler for applying a wear-resistant layer comprising a nickel alloy matrix and intercalated tungsten carbides and vanadium carbides to a surface which is to be protected, using arc welding or plasma welding, comprising in addition to impurities

| | |
|---|---|
| Ni | 20 to 80% by weight, |
| W  | 40 to 70% by weight, |
| V  | 3 to 24% by weight,  |
| B  | 0.1 to 5% by weight, |
| Si | 0 to 2% by weight    |
| C  | 0.1 to 5% by weight  |

Sum (C+B+Si) 0.5 to 12% by weight, Sum of all mixture components 100% by weight, and additionally containing fluxes, as well as tungsten carbide grains with a grain size of 0.01 mm to 0.3 mm and 0.3 mm to 2.0 mm, and vanadium carbide grains with a grain size from 0.05 mm to 0.3 mm.

2. A pulverulent filler for applying a wear-resistant layer comprising a nickel alloy matrix and intercalated tungsten carbides and vanadium carbides to a surface which is to be protected, using arc welding or plasma welding, essentially comprising

| | |
|---|---|
| Ni | 20 to 80% by weight, |
| W | 40 to 70% by weight, |
| V | 3 to 24% by weight, |
| Cr | 4 to 30% by weight, |
| B | 0.1 to 5% by weight, |
| Si | 0 to 2% by weight, |
| C | 0.1 to 5% by weight, |

Sum (C+B+Si) 0.5 to 12% by weight, Sum of all mixture components 100% by weight, and with known fluxes and tungsten carbide grains with a grain size of 0.01 mm to 0.3 mm and of 0.3 mm to 2.0 mm, and vanadium carbide grains with a grain size from 0.05 mm to 0.3 mm.

3. A pulverulent filler for applying a wear-resistant layer comprising a nickel alloy matrix and intercalated vanadium carbides to a surface which is to be protected, using arc welding or plasma welding, essentially comprising

| | |
|---|---|
| Ni | 20 to 80% by weight, |
| C | 10 to 60% by weight, |
| Cr | 4 to 30% by weight, |
| B | 0.1 to 5% by weight, |
| Si | 0 to 2% by weight, |
| C | 0.1 to 5% by weight, |

Sum (C+B+Si) 0.5 to 12% by weight, Sum of all mixture components 100% by weight, And with known fluxes and vanadium carbide grains with a grain size of 0.05 mm to 0.3 mm and of 0.3 mm to 2.0 mm.

4. A pulverulent filler for applying a wear-resistant layer comprising a nickel alloy matrix and intercalated tungsten carbides and vanadium carbides to a surface which is to be protected, using arc welding or plasma welding, essentially comprising

| | |
|---|---|
| Ni | 20 to 80% by weight, |
| V | 10 to 60% by weight, preferably less than 60% by weight, |
| W | 2 to 10% by weight, preferably less than 6% by weight, |
| Cr | 4 to 30% by weight, |
| B | 0.1 to 5% by weight, |
| Si | 0 to 2% by weight, |
| C | 0.1 to 5% by weight, |

Sum (C+B+Si) 0.5 to 12% by weight, Sum of all mixture components 100% by weight, and with known fluxes and vanadium carbide grains with a grain size of 0.05 mm to 0.3 mm and of 0.3 mm to 2.0 mm.

5. A pulverulent filler for applying a wear-resistant layer comprising a nickel alloy matrix and intercalated vanadium carbides to a surface which is to be protected, using arc welding or plasma welding, essentially comprising

| | |
|---|---|
| Ni | 20 to 80% by weight, |
| V | 10 to 60% by weight, |
| B | 0.1 to 5% by weight, |
| Si | 0 to 2% by weight, |
| C | 0.1 to 5% by weight, |

Sum (C+B+Si) 0.5 to 12% by weight Sum of all mixture components 100% by weight, and with known fluxes, and vanadium carbide grains with a grain size of 0.05 mm to 0.3 mm and of 0.3 mm to 2.0 mm.

6. The pulverulent filler as claimed in claims 5, where vanadium prealloys, comprising ferrovanadium, are used as powder filler instead of the vanadium grains which have been introduced into the filler, the vanadium prealloys being converted, in the molten pool, to the vanadium carbide grains of the grain sizes indicated, due to the high affinity of carbon for vanadium.

7. The pulverulent filler as claimed in claim 6, which is present as the filling in a small nickel tube as consumable welding electrode, in particular stick electrode or flux-cored electrode, about 20% by weight of the nickel content of the pulverulent filler being made available by the small nickel tube.

8. The pulverulent filler as claimed in claim 7, wherein the small nickel tube has an external diameter of from 0.5 mm to 8.0 mm, and a wall thickness of from 0.2 mm.

9. The pulverulent filler as claimed in one claim 8, wherein granular fused tungsten/vanadium carbide is used.

10. The pulverulent filler as claimed in claim 9, wherein fused tungsten/vanadium carbide in spheroid form is used.

\* \* \* \* \*

UNITED STATES PATENT AND TRADEMARK OFFICE
CERTIFICATE OF CORRECTION

PATENT NO.     : 6,603,090 B1
DATED          : August 5, 2003
INVENTOR(S)    : Schreiber et al.

It is certified that error appears in the above-identified patent and that said Letters Patent is hereby corrected as shown below:

Title page,
Item [30], Foreign Application Priority Data, should read:
-- [30]            Foreign Application Priority Data
July 18, 1998  (EP) ……………………………….98 113 430.7 --

Signed and Sealed this

Thirtieth Day of December, 2003

JAMES E. ROGAN
*Director of the United States Patent and Trademark Office*